(12) United States Patent
Fuller et al.

(10) Patent No.: US 8,053,530 B2
(45) Date of Patent: *Nov. 8, 2011

(54) POLYELECTROLYTE MEMBRANES MADE OF POLY(PERFLUOROCYCLOBUTANES) WITH PENDANT PERFLUOROSULFONIC ACID GROUPS AND BLENDS WITH POLY(VINYLIDENE FLUORIDE)

(75) Inventors: Timothy J. Fuller, Pittsford, NY (US); Sean M MacKinnon, Fairport, NY (US); Michael R. Schoeneweiss, W. Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 128 days.

This patent is subject to a terminal disclaimer.

(21) Appl. No.: 12/548,350

(22) Filed: Aug. 26, 2009

(65) Prior Publication Data

US 2011/0053036 A1 Mar. 3, 2011

(51) Int. Cl.
*C08F 114/18* (2006.01)

(52) U.S. Cl. ............ 525/326.2; 526/250; 526/252; 526/253; 526/254

(58) Field of Classification Search .......... 525/326.2; 526/250, 252, 253, 254
See application file for complete search history.

(56) References Cited

U.S. PATENT DOCUMENTS

| | | | |
|---|---|---|---|
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 | 8/2001 | Hamrock et al. | |
| 6,444,343 B1 | 9/2002 | Prakash et al. | |
| 6,523,699 B1 | 2/2003 | Akita et al. | |
| 6,559,237 B1 | 5/2003 | Mao et al. | |
| 6,847,518 B2 | 1/2005 | Fukuda et al. | |
| 6,875,537 B2 | 4/2005 | Tani et al. | |
| 6,926,984 B2 | 8/2005 | Asano et al. | |
| 6,933,068 B2 | 8/2005 | Asano et al. | |
| 6,953,653 B2 | 10/2005 | Smith et al. | |
| 6,986,962 B2 | 1/2006 | Oyanagi et al. | |
| 7,001,929 B2 | 2/2006 | Goto et al. | |
| 7,045,241 B2 | 5/2006 | Akita et al. | |
| 2001/0018144 A1 | 8/2001 | Watakabe et al. | |
| 2002/0014405 A1 | 2/2002 | Arcella et al. | |
| 2003/0017379 A1 | 1/2003 | Menashi | |
| 2004/0214058 A1 | 10/2004 | Tada et al. | |
| 2004/0214065 A1 | 10/2004 | Kanaoka et al. | |
| 2005/0014927 A1 | 1/2005 | Akita | |
| 2005/0043487 A1 | 2/2005 | Felix et al. | |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |
| 2006/0177719 A1 | 8/2006 | Fuller et al. | |
| 2007/0042242 A1 | 2/2007 | Tada et al. | |
| 2007/0099054 A1 | 5/2007 | Fuller et al. | |
| 2007/0141237 A1 | 6/2007 | Okiyama et al. | |
| 2008/0027152 A1* | 1/2008 | Maier et al. ............ 521/25 |
| 2009/0278083 A1 | 11/2009 | Fuller et al. | |
| 2009/0278091 A1 | 11/2009 | MacKinnon et al. | |
| 2009/0281245 A1 | 11/2009 | MacKinnon et al. | |
| 2009/0281262 A1 | 11/2009 | MacKinnon et al. | |
| 2009/0281270 A1 | 11/2009 | Fuller et al. | |

FOREIGN PATENT DOCUMENTS

| | | |
|---|---|---|
| JP | 2003535929 T | 12/2003 |
| JP | 2005129298 A | 5/2005 |
| JP | 2005166557 A | 6/2005 |
| JP | 2005179380 A | 7/2005 |
| JP | 2009 249 487 A | 10/2009 |
| WO | 2004/051776 | 6/2004 |
| WO | 2007/052954 A1 | 5/2007 |

OTHER PUBLICATIONS

Smith, D.W. et al., "Perfluorocyclobutane Aromatic Polyethers. Synthesis and Characterization of New Siloxane-Containing Fluoropolymers," Macromolecules 1996, v. 29, pp. 852-860.

Smith, D.W. et al., "Perfluorocyclobutane (PFCB) polyaryl ethers: versatile coatings material," J. of Fluorine Chem., v. 104, pp. 109-117 (2000).

Souzy, R. et al., "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

"Fluorel Technical Data Sheets," MatWeb Material Property Data website, http://www.matweb.com/search/GetMatIsByTradename.aspx?navletter=F&tn=Fluorel%E2%84%A2.

Nafion perfluorinated resin, Sigma-Aldrich Online Catalog, http://www.sigmaaldrich.com/catalog/ProductDetail.do?lang=en&N4=495786|ALDRICH&N5=SEARCH_CONCAT_PNO|BRAND_KEY&F=SPEC.

Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

\* cited by examiner

*Primary Examiner* — Bernard Lipman (74) *Attorney, Agent, or Firm* — Brooks Kushman P.C.

(57) ABSTRACT

A polymer useful as an ion conductor in fuel cells includes a perfluorocyclobutyl moiety and pendant PFSA side groups. The polymer is made by a variation of the Ullmann reaction. Ion conducting membranes incorporating the polymer are provided.

22 Claims, 1 Drawing Sheet

Figure 1

POLYELECTROLYTE MEMBRANES MADE OF POLY(PERFLUOROCYCLOBUTANES) WITH PENDANT PERFLUOROSULFONIC ACID GROUPS AND BLENDS WITH POLY(VINYLIDENE FLUORIDE)

TECHNICAL FIELD

The field to which the disclosure generally relates includes polymer electrolyte and fuel cells.

BACKGROUND

Polymer electrolytes play an important part in electrochemical devices such as batteries and fuel cells. To achieve optimal performance, the polymer electrolyte must maintain a high ionic conductivity and mechanical stability at both high and low relative humidity. The polymer electrolyte also needs to have excellent chemical stability for long product life and robustness. Fluorinated random copolymers have been explored as electrolytes for fuel cells. Due to their inherent random chain configuration, however, random copolymers typically suffer from water swelling at high humidity and excess membrane shrinkage at low humidity. A random copolymer membrane lacks the mechanical robustness to withstand the rigors of hydration and dehydration within an operating fuel cell. Thus, there is a need for an improved polymer electrolyte that maintains robust mechanical properties and high ionic conductivity at a wide range of humidity conditions.

Accordingly, an improved polymer electrolyte molecular architecture and a process of synthesizing such a polymer electrolyte are desired.

SUMMARY OF THE INVENTION

The present invention solves one or more problems of the prior art by providing in at least one embodiment a polymer that includes a polymer segment having formula 1:

wherein:

$Z_1$ is a protogenic group such as $-SO_2X$, $-PO_3H_2$, or $-COX$, and the like;

$E_1$ is an aromatic containing moiety;

A is absent or O or a chain extender having a carbon backbone. In a variation, A includes an ether linkage;

X is an $-OH$, a halogen, an ester, or $P_1$, $P_2$ are each independently absent, $-O-$, $-S-$, $-SO-$, $-SO_2-$, $-CO-$, $-NH-$, $NR_2-$, or $-R_3-$;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another E1 group; and $Q_1$ is a fluorinated cyclobutyl moiety.

In another embodiment, an ion conducting membrane including the polymer having polymer segment 1 is provided.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawing, wherein.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary.

Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
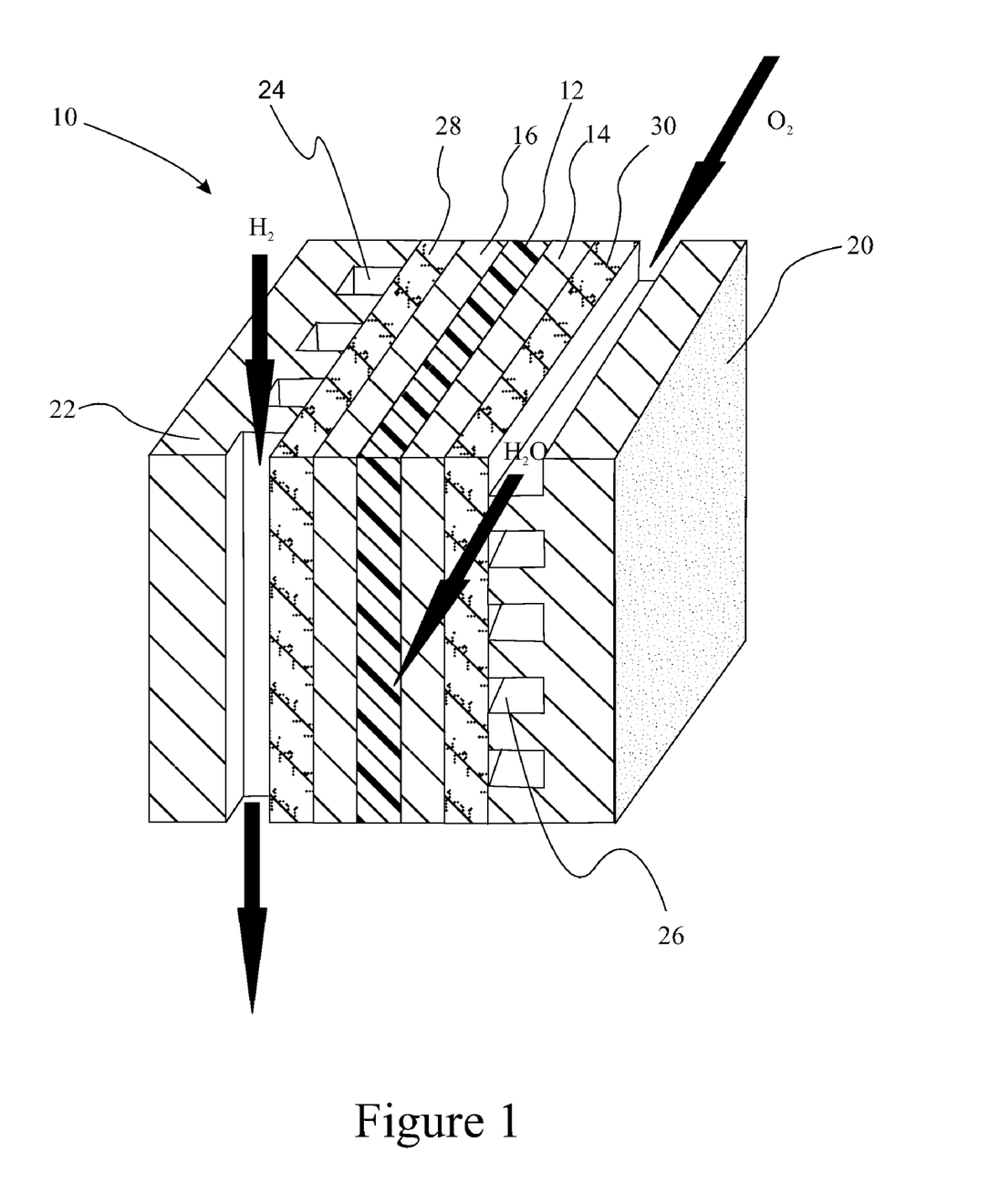
FIG. 1 provides a schematic illustration of a fuel cell incorporating the polymers of an embodiment of the present invention.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive membrane 12 includes one or more of the polymers set forth below. Fuel cell 10 also includes conductive plates 20, 22, gas channels 24 and 26, and gas diffusion layers 28 and 30.

In an embodiment of the present invention, a polymer that is useful for fuel cell ion conductive membrane applications is provided. The polymer of this embodiment includes polymer segment 1:

$$-E_1-P_1-Q_1-P_2- \atop \displaystyle \mathop{|}_{\displaystyle A} \atop \displaystyle \mathop{|}_{\displaystyle CF_2} \atop \displaystyle \mathop{|}_{\displaystyle CF_2} \atop \displaystyle \mathop{|}_{\displaystyle Z_1}$$  1 wherein:

$Z_1$ is a protogenic group such as $-SO_2X$, $-PO_3H_2$, or $-COX$, and the like;

$E_1$ is an aromatic containing moiety;

A is absent or O or a chain extender having a carbon backbone;

X is an $-OH$, a halogen, an ester, or $$-\underset{H}{N}-\underset{\underset{\parallel}{O}}{\overset{\overset{\parallel}{O}}{S}}-R_4;$$

$P_1$, $P_2$ are each independently absent, $-O-$, $-S-$, $-SO-$, $-SO_2-$, $-CO-$, $-NH-$, $NR_2-$, or $-R_3-$;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$ is a fluorinated cyclobutyl moiety and in particular a perfluorocyclobutyl moiety.

In a variation of the present embodiment, polymer segment 1 is repeated j times to form a polymer block described by formula 2.

$$\pm E_1-P_1-Q_1-P_2\pm_j \atop \displaystyle \mathop{|}_{\displaystyle A} \atop \displaystyle \mathop{|}_{\displaystyle CF_2} \atop \displaystyle \mathop{|}_{\displaystyle CF_2} \atop \displaystyle \mathop{|}_{\displaystyle Z_1}$$  2

In a refinement, j is from about 1 to 10,000. In another refinement, j is from about 2 to about 100. In another refinement, j is from about 3 to about 50. In still another refinement, j is from about 4 to about 40.

In a variation of the present invention, the polymer having polymer segment 1 includes a second polymer segment having formula 3:

$$E_2-P_3-Q_2-P_4$$  3 wherein:

$E_2$ is an aromatic containing moiety;

$P_3$, $P_4$ are each independently absent, $-O-$, $-S-$, $-SO-$, $-SO_2-$, $-CO-$, $-NH-$, $NR_2-$, or $-R_3-$;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene; and $Q_2$ is a fluorinated cyclobutyl moiety.

In a refinement, polymer segment 3 is repeated k times to form polymer block 4:

$$\pm E_2-P_3-Q_2-P_4\pm_k$$  4

In a refinement, k is from about 1 to about 10,000. In another refinement, k is from about 2 to about 100. In another refinement, k is from about 3 to about 50. In still another refinement, k is from about 4 to about 40.

In another variation, polymer blocks 2 and 4 are connected by a linking group L1:

$$\pm E_2-P_3-Q_2-P_4\pm_k L_1\pm E_1-P_1-Q_1-P_2\pm_j \atop \displaystyle \mathop{|}_{\displaystyle A} \atop \displaystyle \mathop{|}_{\displaystyle CF_2} \atop \displaystyle \mathop{|}_{\displaystyle CF_2} \atop \displaystyle \mathop{|}_{\displaystyle Z_1}$$

$$\pm E_1-P_1-Q_1-P_2\pm_j L_1\pm E_2-P_3-Q_2-P_4\pm_k \atop \displaystyle \mathop{|}_{\displaystyle A} \atop \displaystyle \mathop{|}_{\displaystyle CF_2} \atop \displaystyle \mathop{|}_{\displaystyle CF_2} \atop \displaystyle \mathop{|}_{\displaystyle Z_1}$$

Examples of $L_1$ include the following linking groups:

$$-O-\underset{F}{C}=\underset{F}{C}-O-, \quad -O-CF_2-CHF-O-,$$

where $R_5$ is an organic group, such as an alkyl or acyl group.

In a refinement of the present embodiment, $Q_1$, $Q_2$ are each independently selected from the group consisting of:

In a variation of the present embodiment, A is an aromatic-containing moiety, an aliphatic-containing moiety, a polyether, a fluorinated polyether, and combinations thereof. In another refinement of the present embodiment, -ACF$_2$CF$_2$—Z$_1$ comprises a moiety having the following formula:

a, b, c, p are independently an integer from 1 to 10. In a refinement, p is 1, a is 0, b is 0, and c is 2. In another refinement, p is 0, a is 0, b is 0 and c is 2. In still another refinement, p is 1, a is 1, b is 0, and c is 2. In still another other refinement, p is 0, a is 0, b is 0, and c is 4. In yet another refinement, p is 0, a is 0, b is 0 and c is 1. In a variation, -ACF$_2$CF$_2$—Z$_1$ comprises:

As set forth above, $E_1$ and $E_2$ include one or more aromatic rings. For example, $E_1$ and $E_2$, include one or more of the following moieties:

In another embodiment of the present invention, a polymer blend is provided. The polymer blend of this embodiment includes a first polymer and a second polymer that includes the polymer segment 1 set forth above. The first polymer is different than the second polymer. In one variation, the first polymer is a non-ionic polymer. In a refinement, the non-ionic polymer is a fluorine-containing polymer such as a fluoro-elastomer or fluoro-rubber. The fluoro-elastomer may be any elastomeric material comprising fluorine atoms. The fluoro-elastomer may comprise a fluoropolymer having a glass transition temperature below about 25° C. or preferably, below 0° C. The fluoro-elastomer may exhibit an elongation at break in a tensile mode of at least 50% or preferably at least 100% at room temperature. The fluoro-elastomer is generally hydrophobic and substantially free of ionic groups. The fluoro-elastomer may be prepared by polymerizing at least one fluoro-monomer such as vinylidene fluoride, tetrafluoroethylene, hexafluoropropylene, vinylfluoride, vinylchloride, chlorotrifluoroethylene, perfluoromethylvinyl ether, and trifluoroethylene. The fluoro-elastomer may also be prepared by copolymerizing at least one fluoro-monomer and at least one non-fluoro-monomer such as ethylene, propylene, methyl methacrylate, ethyl acrylate, styrene and the like. The fluoro-elastomer may be prepared by free radical polymerization or anionic polymerization in bulk, emulsion, suspension and solution. Examples of fluoro-elastomers include poly(tetrafluoroethlyene-co-ethylene), poly(vinylidene fluoride-co-hexafluoropropylene), poly(tetrafluoroethylene-co-propylene), terpolymer of vinylidene fluoride, hexafluoropropylene and tetrafluoroethylene, and terpolymer of ethylene, tetrafluoroethylene and perfluoromethylvinylether. Some of the fluoro-elastomers are commercially available from Arkema under trade name Kynar Flex® and Solvay Solexis under the trade name Technoflon®, from 3M under the trade name Dyneon®, and from DuPont under the trade name Viton®. For example, Kynar Flex 2751 is a useful copolymer of vinylidene fluoride and hexafluoropropylene with a melting temperature between about 130° C. and 140° C. The glass transition temperature of Kynar Flex 2751 is about −40 to −44° C. The fluoro-elastomer may further comprise a curing agent to allow crosslinking reaction after being blended with a second polymer that includes a cyclobutyl moiety.

In another variation of this embodiment, the first polymer is a perfluorosulfonic acid polymer (PFSA). In a refinement, such PFSAs are a copolymer containing a polymerization unit based on a perfluorovinyl compound represented by:

where m represents an integer of from 0 to 3, q represents an integer of from 1 to 12, r represents 0 or 1, and $X^1$ represents a fluorine atom or a trifluoromethyl group and a polymerization unit based on tetrafluoroethylene.

In a variation of this embodiment, the first polymer is present in an amount from about 5 to about 70 weight percent of the total weight of the polymer blend. In a further refinement, the first polymer is present in an amount from about 10 to about 60 weight percent of the total weight of the polymer blend. In still another refinement, the polymer having polymer segment 1 or polymer block 2 is present in an amount from about 30 to about 95 weight percent of the total weight of the polymer blend. In still another refinement, the polymer having polymer segment 1 or polymer block 2 is present in an amount from about 40 to about 90 weight percent of the total weight of the polymer blend.

In another embodiment of the present invention, a method for making the polymers including the polymer segment of formula 1 is provided. The method of this embodiment advantageously utilizes a variation of the Ullmann reaction. In this embodiment, the polymer having polymer unit 3 is halogenated to form a polymer having polymer unit 4:

wherein $X_2$ is a halogen, j, $E_1$, $P_1$, $Q_1$, and $P_2$ are as set forth above. In a variation, $X_2$ is Br or I. In another refinement, $X_2$ is Br. In a subsequent step, the polymer having polymer unit 4 is coupled as set forth in Scheme 1 to form the polymer having polymer unit 2.

In another embodiment, a method for making the polymers including the polymer segment of formula 1 is provided. In accordance with the method of this embodiment, groups with at least one hydroxyl that may be functionalized as set forth below:

-continued

The following examples illustrate the various embodiments of the present invention. Those skilled in the art will recognize many variations that are within the spirit of the present invention and scope of the claims.

Preparation of PFCB Polymers
Two Pot Synthesis of PFCB Block Copolymer

Step 1: BPVE (BPVE is 4,4'-biphenyl-1,1'-bis(perfluorovinyl ether)) monomer (600 g) is dissolved in diphenyl ether (DPE, 150 g) and purged with bubbling argon for 30 minutes. The monomer solution is then heated, under an inert atmosphere, as follows: (i) 140° C., 18 hrs; (ii) 160° C., 8 hrs; (iii) 180° C., 18 hrs. The reaction is then cooled to 60° C. and THF added to fully dissolve the oligomer. The product is precipitated as a white solid by pouring the THF solution into vigorously stirred methanol. After extensive washing with methanol, using a Soxhlet extractor, to remove very low molecular weight material, the product is dried overnight at 60° C. under vacuum. Yield=80%. [GPC Sample #1–Mn=8.5 kg/mol, DPI=2.38].

Step 2: BPVE (BPVE is 4,4'-biphenyl-1,1'-bis(perfluorovinyl ether)) oligomer (500 g, Mn=8.5 kg/mol) and 6F (6F is 4,4'-hexafluoroisopropylidene-diphenyl-1,1'-bis(perfluorovinyl ether) or 4,4'-hexafluoroisopropylidene-1,1'-bis(phenyl perfluorovinyl ether) monomer (250 g) are dissolved in diphenyl ether (DPE, 500 g) in an oven dried 2 L reaction kettle equipped with a condenser and mechanical stirrer with a stainless steel stir shaft, turbine and stir blade. The reaction mixture is purged with bubbling argon at 80° C. for 2 hrs and then the reaction is heated, with stirring, as follows: (i) 160° C., 7 hrs; (ii) 180° C., 16 hrs; (iii) 200° C., 4 hrs; (iv) 220° C., 2 hrs; (v) 230° C., 16 hrs [GPC Sample #2–Mn=36.5 kg/mol, PDI=2.4]; (vi) 230° C., 5 hrs; (vii) 240° C., 2 hrs [GPC Sample #3–Mn=36.5 kg/mol, PDI=2.3]; (viii) 240° C., 16 hrs [GPC Sample #4–Mn=54.7 kg/mol, PDI=2.10]; (ix) 240° C., 6 hrs; (x) 250° C., 3 hrs. GPC data for samples taken at various stages during the polymerization are shown below. The reaction mixture is then cooled and the resulting copolymer is dissolved in THF and poured slowly into vigorously stirred methanol in order to precipitate the polymer. Traces of DPE are removed from the polymer by further washing with methanol in a Soxlet extractor after which the product is dried under vacuum to give a colorless fibrous solid (90% yield). Elemental analysis indicates [53.05% C, 1.93% H, 38.75% F].

One Pot Synthesis of PFCB Block Copolymer

High purity BPVE monomer (500 g) is dissolved in diphenyl ether (DPE, 125 g) in an oven dried 2 L reaction kettle equipped with a condenser and mechanical stirrer with a stainless steel stir shaft, turbine and stir blade. The reaction mixture is purged with bubbling argon at 80° C. for 2 hrs and then the temperature is gradually raised (in increments of 20° C.) before heating to 140° C. and stirred at this temperature overnight (16 hrs). The solution is then heated at 160° C. for 8 hrs and finally 180° C. overnight (16 hrs). The reaction mixture is cooled to 100° C. and sampled for GPC analysis [GPC Sample #1–Mn=7.5 kg/mol, PDI=2.6] in order to determine the molecular weight (block length) of BPVE oligomer. To this solution is added 6F monomer (250 g) and DPE (375 g) and the temperature is gradually raised to 160° C. Heating is then continued using the following temperature profile with samples taken for GPC analysis as described: (i) 160° C., 16 hrs; (ii) 180° C., 4 hrs; (iii) 200° C., 2 hrs; (iv) 220° C., 2 hrs; (v) 230° C., 16 hrs [GPC Sample #2–Mn=43.7 kg/mol, PDI=1.93]; (vi) 240° C., 5 hrs [GPC Sample #3–Mn=51.5 kg·mol, PDI=1.81]; (vii) 240° C., 20 hrs [GPC Sample #4–Mn=75.5 kg/mol, PDI=2.10]. GPC data is shown below. The reaction mixture is cooled and the resulting copolymer is dissolved in THF and poured slowly into vigorously stirred methanol in order to precipitate the polymer. Traces of DPE are removed from the polymer by further washing with methanol in a Soxlet extractor after which the product is dried under vacuum to give a colorless fibrous solid (90% yield). Elemental analysis indicates [52.59% C, 2.10% H, 37.04% F].

Procedure for the Bromination of PFCB Polymers. To a screw-cap jar with a Teflon®-lined lid is added a magnetic stir bar and then the perfluorocyclobutane (PFCB) polymer (5 grams). The details of preparing the PFCB polymer are set forth below. Methylene chloride (100 mL) is added and the polymer rapidly dissolved with stirring within 1 hour. After 19 hours, iron powder (Sigma-Aldrich catalog number 267953, consisting of particle sizes of less than 10-micrometers, 0.27 g) is added, and the stirring speed is adjusted and maintained to keep the iron powder dispersed throughout the liquid. When the appropriate stirring speed is achieved, the mixture appears gray. Bromine (between 3.4 and 5 g, accurately weighed by difference) is added, and the reaction mixture is stirred for 19 hours at 23° C. Sodium bisulfate (10 g) in water (90 g) is then added and the mixture turned from a yellow-red-brown color to white. The mixture is transferred to a separatory funnel and the aqueous layer is removed and discarded. The methylene chloride layer is washed with four, 100-mL portions of water and the methylene chloride layer is then pressure filtered through a 5-micron, Mitex® filter (Millipore). The methylene chloride layer is added portion-wise to methanol (2 L) using a Waring blender, and the coagulated polymer is isolated by filtration. The white, flocculated polymer is washed with three, 1-L portions of distilled water. Water washings are continued until the water filtrate no longer appears cloudy. The polymer is then washed with methanol (2 L), and after drying under vacuum at 60° C., the polymer is then suitable to be used directly in the Ullmann coupling reaction, described below. The polymer can be further purified by re-dissolving in methylene chloride at 10 wt. % solids, coagulation with methanol (2 L), isolation by filtration, and then vacuum drying at 60° C. The bromination reaction was carried out with 6F-homopolymer (product had 1.53 wt. % Br), BPVE homopolymer (products had 15.23, 20.20, 45.01 wt. % Br, respectively dependent on $Br_2$ to polymer ratio), and three different block polymers of 8,000-molecular weight BPVE oligomer co-polymerized with 6F monomer (products had between 25.02 and 31.85 wt. % Br, dependent on $Br_2$ to polymer ratio).

Preparation of Potassium Tetrafluoro-2-(tetrafluoro-2-iodoethoxy)ethanesulfonate. Tetrafluoro-2-(tetrafluoro-2-iodoethoxy) ethanesulfonyl fluoride (Magical Scientific, Oklahoma City) is hydrolyzed to potassium tetrafluoro-2-(tetrafluoro-2-iodoethoxy)ethanesulfonate as follows. To a 500-mL, Teflon®-lined screw cap jar with a magnetic stir bar is added tetrafluoro-2-(tetrafluoro-2-iodoethoxy)ethanesulfonyl fluoride (250.01 g), de-ionized water (82.42 g), methylene chloride (83 mL), distilled 2,6-lutidine (79.97 g), and 1-molar tetrabutylammonium fluoride (1.87 g). The mixture is magnetically stirred for four days, and then the aqueous layer is removed using a separatory funnel. The aqueous layer is extracted three times with methylene chloride (100-mL each time). The methylene chloride layers are combined in a 1-L, round-bottom flask and the volatiles are distilled off under vacuum with gentle heating (less than 50° C.). Tetrahydrofuran (500 mL) is added to the residue and anhydrous potassium carbonate (46.97 g, ground-up with a mortar and pestle) is added. The reaction mixture is magnetically stirred under argon for 10 hours at 23° C., and gas evolution is evident. The reaction mixture is pressure filtered though a 5-micrometer Mitex® into a 1-L pear shaped flask and the solvent is removed under vacuum with gentle heating (less than 50° C.). The residue in 300-mL of a 1:1 mixture of tetrahydrofuran and toluene is heated with magnetic stirring on a hot plate until a solution is formed. On cooling, crystals form which are isolated by vacuum filtration and dried. A white soap-like solid is obtained and identified as crop 1 and is dried at 60° C. for 16 hours. Under vacuum, more crystals formed in the filtrate, which are vacuum-filtered and identified as crop 2. Upon further evaporation of the filtrate under vacuum, more crystals form which are filtered. This third crop of off-white crystals is combined with the crop 2 crystals and then after another re-crystallization from a 1:1 mixture of toluene and tetrahydrofuran, a white soap-like solid is obtained. After drying at 60° C. overnight in a forced air oven, the white solid is used for the Ullmann coupling reaction.

Ullmann Coupling Reaction of Potassium Tetrafluoro-2-(tetrafluoro-2-iodoethoxy)ethanesulfonate with Brominated, PFCB-Polymers. All reagents are dried under vacuum at 60° C. before use. To a 3-neck, 500-mL flask, equipped with a reflux condenser, argon inlet, and mechanical stirrer and situated in an oil bath, is added brominated PFCB polymer (10 g, 21.1 wt. % bromine, made by adding 8.0 g of $Br_2$ to 10-g PFCB-polymer, as described above), dimethyl sulfoxide (20 mL, stored over 4 Å-molecular sieves), and N,N-dimethyl formamide (80 mL, stored over 4 Å-molecular sieves). The mixture is heated in an oil bath set at 130° C., and the polymer starts to dissolve rapidly between 80 and 95° C. While the stirred solution is being heated in the oil bath at 130° C. under argon, copper powder (15.47 g, 45-micrometer particles, Acros 196575000) is rapidly added and the mixture is stirred for 2 hours. Potassium tetrafluoro-2-(tetrafluoro-2-iodoethoxy)ethanesulfonate (27.73 g) dissolved in N,N-dimethyl formamide (100 mL) is then added drop-wise (at a rate of one drop every 3 to six seconds). Stirring under argon in the 130° C. oil bath is continued for 18 hours. The mixture is allowed to settle at 23° C., and the solvent layer is pressure-filtered through a 5-micrometer Mitex® filter. The filtrate is added to 1 liter of 10% hydrochloric acid (prepared by adding 100-mL of concentrated HCl to 900-mL, deionized water) using a Waring blender. The mixture is stirred 16 hours at 23° C., and then the polymer is collected by filtration, washed extensively with water (3 liters) using a Waring blender, filtered and dried in vacuo. The yield is 14.23 g. The copper residue remaining in the flask after added washings with N,N-dimethylacetamide is found to contain an additional 0.5 g of polymer. The polymer is dissolved in alcohols (ethanol, methanol, or isopropanol) and N,N-dimethylacetamide. The polymer as a 10 wt. % solution (usually in N,N-dimethylacetamide) is solution coated onto window-pane glass using a Bird applicator bar (with a 10-mil coating gap) and is then dried at 80° C. for 15 minutes. The film is floated off the glass with de-ionized water and is then boiled in 2-molar sulfuric acid for 1 hour. After extensive washing with de-ionized water (until the water washings are neutral), the film is air-dried and used as a polyelectrolyte membrane in a fuel cell. The membrane is further characterized as follows. Before titration, a sample of the membrane is heated using a hairdryer for 70 seconds in a heated air stream at between 23 and 100° C. An accurately-weighed sample of membrane (usually punched out as a 4.5 cm×0.9 cm×0.0020 cm piece and weighing 0.0120 g) is placed in 50-mL water containing 1.0 g of sodium chloride and is titrated to pH 7 with standardized, 0.0100-molar sodium hydroxide. Another similar sample is boiled in water (100-mL) for 1 hour and the water uptake and volume swell are determined. A similar sample is placed in a BekkTech, 4-point conductivity cell and proton conductivity is measured with percent relative humidity (between 20 and 100%) at 80° C. A dried sample, prepared the same as that used for titration, is subjected to EDX analysis to determine elemental composition. The samples prepared as described has an ion exchange capacity of 1.31 milliequivalents of H+ per gram, a water uptake of 645.5 wt. % (995.3 vol. %), and an elemental composition (by EDX) of 44.11% C; 13.31% O, 33.07% F, 1.24% Br, and 5.27% S. The proton conductivity (S/cm) versus percent relative humidity (in parentheses) at 80° C. is as follows: 0.005672 (20%), 0.01528 (30%), 0.03004 (40%), 0.04918 (50%), 0.07570 (60%), 0.1122 (70%), 0.1612 (80%), 0.2373 (90%), and 0.3187 S/cm (100%). When more than 30 wt. % bromine is attached to the PFCB polymer, polymer precipitation during the Ullmann coupling occurred.

Blends of Sulfonated-PFCB Polymers with Kynar Rubber. A 30 wt. % Kynar blend is made as follows: A 10 wt. % solution of sulfonated polymer is made by dissolving 1 gram of polymer in 9 grams of N,N-dimethylacetamide. To this is added 2.857 grams of a 15 wt. % solution of Kynar 2751 in N,N-dimethylacetamide. The mixture is vigorously stirred and roll-milled for 1 hour before being pressure filtered through a 5 micrometer, Mitex® filter. The filtrate is placed in a centrifuge at 1000 rpms for ten minutes to remove air bubbles and then the solution is coated onto window pane glass using a Bird applicator bar with an 8-mil coating gap. The film is dried for 15 minutes at 80° C. and is then floated off the glass with de-ionized water. The 16-micrometer thick membrane is boiled for 1 hour in 2-molar sulfuric acid and then is extensively washed with water until the washings are neutral. The resulting membrane is evaluated as described above, except EDAX is not routinely carried out on the Kynar blended samples. The membrane is also subjected to a relative humidity cycling test between 0 and 150% relative humidity over 2 minute intervals until 20,000 cycles are achieved or until a leak of 10 standard cubic centimeters at 10 psi is detected (which constitutes a test failure). A 40 wt. % Kynar blend is made by adding 4.444 grams of a 15 wt. % Kynar 2751 solution in N,N-dimethylacetamide to 10 grams of a 10 wt. % solution of the sulfonated-PFCB polymer in N,N-dimethylacetamide.

Membranes are formed by coating a solution containing the polymer composition onto a window-pane glass with a 3-mil Bird applicator bar modified with a single layer thickness of masking tape to increase the coating gap. The wet film is heated (at about 80° C.) until dry to the touch. The membranes are then floated off the glass with water and air-dried to produce free-standing films The above description of embodiments of the invention is merely exemplary in nature and, thus, variations thereof are not to be regarded as a departure from the spirit and scope of the invention.

What is claimed is:

1. A polymer that is useful for fuel cells, the polymer comprising polymer segment 1:

1 wherein:
  $Z_1$ is —$SO_2X$, —$PO_3H_2$, or —COX;
  $E_1$ is an aromatic containing moiety;
  A is absent or O or a chain extender having a carbon backbone;
  X is an —OH, a halogen, an ester, or $P_1$, $P_2$ are each independently absent, —O—, —S—, —SO—, —$SO_2$—, —CO—, —NH—, $NR_2$—, or —$R_3$—;
  $R_2$ is $C_{1-25}$ alkyl, $C_{1-25}$ aryl, or $C_{1-25}$ arylene;
  $R_3$ is $C_{1-25}$ alkylene, $C_{1-25}$ perfluoroalkylene, or $C_{1-25}$ arylene;
  $R_4$ is trifluoromethyl, $C_{1-25}$ alkyl, $C_{1-25}$ perfluoroalkylene, $C_{1-25}$ aryl, or another $E_1$ group; and
  $Q_1$ is a fluorinated cyclobutyl moiety.

2. The polymer of claim 1 wherein polymer segment 1 is repeated j times.

3. The polymer of claim 2 wherein j is from 1 to 10,000.

4. The polymer of claim 2 further comprising block a polymer block having formula 4:

4 wherein:
  k is from 1 to 10,000;
  $E_2$ is an aromatic-containing moiety;
  $P_3$, $P_4$ are each independently absent, —O—, —S—, —SO—, —$SO_2$—, —CO—, —NH—, $NR_2$—, or —$R_3$—; and
  $Q_2$ is a fluorinated cyclobutyl moiety.

5. The polymer of claim 4 wherein $E_1$ and $E_2$ each independently comprise a component selected from the group consisting of:

6. The polymer of claim 1 wherein $Q_1$ is selected from the group consisting of:

7. The polymer of claim 1 wherein A is an aromatic-containing moiety, an aliphatic-containing moiety, an ether, or a fluorinated polyether.

8. The polymer of claim 1 wherein $-ACF_2CF_2-Z_1$ comprises a moiety having the following formula:

wherein:

a, b, c, p are independently an integer from 1 to 10.

9. The polymer of claim 1 wherein $-ACF_2CF_2-Z_1$ comprises:

$CF_2-CF_2-O-CF_2-CF_2-Z_1$.

10. The polymer of claim 1 wherein $Z_1$ is $SO_2OH$.

11. A polymer blend comprising:

a first polymer; and a second polymer including polymer block 1:

wherein:

j is from 1 to 10,000;

$Z_1$ is $-SO_2X$, $-PO_3H_2$, or $-COX$;

$E_1$ is an aromatic containing moiety;

A is absent or O or a chain extender having a carbon backbone;

X is an $-OH$, a halogen, an ester, or $P_1$, $P_2$ are each independently absent, $-O-$, $-S-$, $-SO-$, $-SO_2-$, $-CO-$, $-NH-$, $NR_2-$, or $-R_3-$;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$ is a fluorinated cyclobutyl moiety.

12. The polymer blend of claim 11 wherein the second polymer further includes polymer block 4:

$$-\!\!\!-\!\!\!\left[E_2-P_3-Q_2-P_4\right]_{\overline{k}}\!\!\!-\!\!\!- \quad 4$$

wherein:

k is from 1 to 10,000;

$E_2$ is an aromatic-containing moiety;

$P_3$, $P_4$ are each independently absent, $-O-$, $-S-$, $-SO-$, $-SO_2-$, $-CO-$, $-NH-$, $NR_2-$, or $-R_3-$; and

$Q_2$ is a fluorinated cyclobutyl moiety.

13. The polymer of claim 12 wherein $E_1$ and $E_2$ each independently comprise a component selected from the group consisting of:

14. The polymer blend of claim 11 wherein A is an aromatic-containing moiety, an aliphatic-containing moiety, a polyether, or a fluorinated polyether.

15. The polymer blend of claim 11 wherein -ACF$_2$CF$_2$—Z$_1$ comprises a component selected from the group consisting of:

wherein:

a, b, c, p are independently an integer from 1 to 10.

16. The polymer blend of claim 11 wherein the first polymer comprises a PFSA polymer.

17. The polymer blend of claim 11 wherein first polymer comprises a fluoroelastomer or fluoro-rubber.

18. The polymer blend of claim 11 wherein the first polymer is present in an amount from 5 to 70 weight percent, based on total weight of the polymer blend.

19. An ion conducting membrane including a polymer comprising polymer segment 1:

wherein:

Z$_1$ is —SO$_2$X, —PO$_3$H$_2$, or —COX;

E$_1$ is an aromatic containing moiety;

A is absent or O or a chain extender having a carbon backbone;

X is an —OH, a halogen, an ester, or

P$_1$, P$_2$ are each independently absent, —O—, —S—, —SO—, —SO$_2$—, —CO—, —NH—, NR$_2$—, or —R$_3$—;

R$_2$ is C$_{1-25}$ alkyl, C$_{1-25}$ aryl, or C$_{1-25}$ arylene;

R$_3$ is C$_{1-25}$ alkylene, C$_{1-25}$ perfluoroalkylene, or C$_{1-25}$ arylene;

R$_4$ is trifluoromethyl, C$_{1-25}$ alkyl, C$_{1-25}$ perfluoroalkylene, C$_{1-25}$ aryl, or another E$_1$ group; and Q$_1$ is a fluorinated cyclobutyl moiety.

20. The membrane of claim 19, further comprising a polymer block having formula 4:

wherein:

k is from 1 to 10,000;

E$_2$ is an aromatic-containing moiety;

P$_3$, P$_4$ are each independently absent, —O—, —S—, —SO—, —SO$_2$—, —CO—, —NH—, NR$_2$—, or —R$_3$—; and

Q$_2$ is a fluorinated cyclobutyl moiety.

21. The polymer of claim 20 wherein polymer segment 1 is repeated j times.

22. The polymer of claim 20 wherein E$_1$ and E$_2$ each independently comprise a component selected from the group consisting of:

-continued

* * * * *